(12) United States Patent
Gillaspie et al.

(10) Patent No.: US 9,471,472 B2
(45) Date of Patent: Oct. 18, 2016

(54) METHOD AND SYSTEM FOR ENTERING INFORMATION

(71) Applicant: TestPlant Europe Ltd., London (GB)

(72) Inventors: Jonathan Gillaspie, Boulder, CO (US); Douglas Simons, Boulder, CO (US); Antony Edwards, London (GB)

(73) Assignee: TESTPLANT EUROPE LIMITED, London (GB)

( * ) Notice: Subject to any disclaimer, the term of this patent is extended or adjusted under 35 U.S.C. 154(b) by 40 days.

(21) Appl. No.: 14/641,012

(22) Filed: Mar. 6, 2015

(65) Prior Publication Data

US 2015/0254170 A1  Sep. 10, 2015

(30) Foreign Application Priority Data

Mar. 7, 2014 (GB) .................................. 1404096.8

(51) Int. Cl.
*G06F 11/00* (2006.01)
*G06F 11/36* (2006.01)

(52) U.S. Cl.
CPC ....... *G06F 11/3684* (2013.01); *G06F 11/3688* (2013.01)

(58) Field of Classification Search
USPC .......................................................... 714/33
See application file for complete search history.

(56) References Cited

U.S. PATENT DOCUMENTS

| 5,335,342 A | 8/1994 | Pope et al. | |
| 2003/0191987 A1 | 10/2003 | Brown | |
| 2006/0174162 A1* | 8/2006 | Varadarajan | G06F 11/263 714/38.14 |
| 2008/0282124 A1* | 11/2008 | Esposito | G06F 11/3672 714/736 |
| 2011/0113287 A1 | 5/2011 | Gururaj | |
| 2011/0184689 A1 | 7/2011 | Awedikian et al. | |

FOREIGN PATENT DOCUMENTS

| CN | 1971535 A | 5/2007 |
| CN | 103019930 A | 4/2013 |
| CN | 103109930 A | 4/2013 |
| GB | 2492874 A | 1/2013 |
| JP | H0981415 A | 3/1997 |
| JP | 2012103786 A | 5/2012 |
| WO | 2007055610 A1 | 5/2007 |

OTHER PUBLICATIONS

UKIPO Combined Search and Examination Report dated Sep. 10, 2014, for Patent Application No. GB1404100.8 filed Mar. 7, 2014.
UKIPO Combined Search and Examination Report dated Aug. 29, 2014, for Patent Application No. GB1404096.8 filed Mar. 7, 2014.

(Continued)

*Primary Examiner* — Sarai Butler
(74) *Attorney, Agent, or Firm* — Conley Rose, P.C.

(57) ABSTRACT

A method of updating a test description forming part of an automated test. The method includes obtaining a first time value associated with the sending of an instruction contained within the test description from the test computer to the system under test, obtaining a second time value associated with the receiving of an image comprising at least a portion of a GUI output of the system under test at the test computer, and using one or more processor devices to compare the first and second time values to determine timing information and update the test description using the timing information.

23 Claims, 7 Drawing Sheets

(56) References Cited

OTHER PUBLICATIONS

Proceedings Third International Workshop on Object-Oriented Real-Time Dependable Systems, 1997, Clarke et al., "Automatic Generation of Tests for Timing Constraints From Requirements," pp. 199-206, DOI:10.1109/WORDS.1997.609955.

Proceedings Third International Workshop on Object-Oriented Real-Time Dependable Systems, 1997, Clarke et al., "Automatic Generation of Tests for Timing Constraints from Requirements," pp. 199-206 DOI:10.1109/WORDS.1997.609955.

UKIPO Search Report Report dated Aug. 28, 2014, for British Patent Application No. GB1404096.8.

* cited by examiner

METHOD AND SYSTEM FOR ENTERING INFORMATION

CROSS-REFERENCE TO RELATED APPLICATIONS

The present application claims priority to Patent Application No. GB 1404096.8, filed Mar. 7, 2014, entitled "Method and System for Entering Information," which is hereby incorporated herein by reference in its entirety.

BACKGROUND

The present disclosure relates to methods and systems for entering information into an automated computer test for testing of computer programs, such as software applications.

In recent times, more and more computer programs are being developed and used to facilitate aspects of modern life. As computing power and demand for new software features increase, so does the complexity of software products and the code that drives them. This includes increased inter-operability with different devices and software applications. As the computer application and device market becomes more competitive, the number of different device types and operating systems also increases. A program developer is therefore often faced with various devices using various communication protocols and various other software applications to take into account when developing new software. As a result, the intended software product becomes increasingly prone to errors, flaws, failures, or faults (otherwise known as 'bugs') in the program. Typically, these 'bugs' are only discovered when the software is run. The testing of a software product, pre-launch, is therefore important to a software developer.

Software test engineers commonly test the functionality and behavior of a program both pre and post launch. When performing testing, it is desirable to test out the software on a large number of devices and operating systems to ensure the product is ready for widespread sale for (and can be supported by) all types of computer system. A program which works well on one type of device may experience difficulties running on another type of device. The testing can therefore be a time consuming exercise. Accordingly, the test engineer may want to test multiple devices without having to physically interface with each System Under Test (SUT). Typically the same test will need to be executed a number of different times on the same operating system. Furthermore, when having to perform the same test on a number of different devices, the test engineer would ideally want to run the same sequence of steps without actually having to input each and every step for every test.

One of the most important times to test software is when new versions of the software are released. When such new versions are released, a development team typically creates a "candidate" version of the software. The software testers then test it to find bugs and send the candidate version back to the development team for improvement. The development team then creates a new "candidate". The testers then re-test it to find further bugs and again send it back to development. This loop continues until the software works correctly and it is delivered to customers.

At some further point in time, the development team will typically add some new features to the existing program. The testers then not only have to test the new features, but also that the old features have not 'broken' (i.e. ceased to operate as desired) with the introduction of and/or interaction with the changes. This is called "regression testing".

Therefore over the life of a software product, a single test case will be executed 10s, 100s, possibly 1000s of times.

Test programs are known to test the functionality of an SUT. Typically the test program is run upon a computing device or computing system that is remote from the SUT. The computer system running the test program is however in communication with the SUT so that the test program can interact with the SUT. The SUT may be, for example, a PC running a version of Microsoft Word™ upon a Windows 7™ operating system.

Test programs typically test an SUT by interacting with the SUT and validating the state of the SUT according to an input test description. Test descriptions may also be referred to as automated test descriptions. Test descriptions can take many forms including but not limited to text instructions, software in source code or binary form, work-flows in a diagrammatical form (such as a flow chart). Executing (or 'running') the test description through the test program allows the system under test to be tested automatically, without requiring a test engineer to provide input to the testing process, other than initiating it.

Some test programs that use automated test descriptions are known. One test program that helps software engineers automate the testing process is 'EggPlant™' by TestPlant™. The EggPlant™ software tool allows a user to create and subsequently execute an automated test description to test a large number of SUTs. This test program interacts and controls an SUT by receiving and analyzing images of the SUT Graphical User Interface (GUI).

Test programs such as EggPlant™ that utilize GUI images operate by identifying expected image objects in a GUI image that relate to executable functions that the test description may wish to identify and interact with or indicate the status of the SUT. Once the expected image object has been identified in the GUI image, the test program description can move to the next step in the test. The identification of the expected image object is performed using image analysis. The image analysis searches the GUI image for the expected image object using an existing reference image that is similar or identical to an expected image object. When a match is found, the expected image object is identified. Examples of image objects may include: an image of a button on the GUI that when 'clicked' would open a dialogue box, or the presence of a particular graphical object that signified the completion of a particular action performed by the target program. The test program may use image analysis techniques to perform these comparisons.

Reference images are typically created when generating the test description. When generating the test description the user typically uses the test program in a 'description creation mode', to navigate an SUT. Typically the navigation involves manually testing a particular SUT. As the user performs the testing steps, the information about the steps is entered into the test description. Thus when the test description is completed and subsequently run automatically by the test program to test a further SUT, the same testing steps are performed upon the further SUT.

The test description is typically created either manually and/or automatically by a test engineer using the test program. Where commands in the test description require the use of reference images as described above, the user creating the test description manually selects the desired portion of a GUI image (taken from the SUT being tested) using an image selection tool whereby the selected portion of the GUI image is saved as the reference image.

As the user navigates the SUT during 'description creation mode', several steps are commonly undertaken when creating each line in the description. Such steps may include, for example, the user stopping to think what the next line should be or what reference image would be suitable to capture, the user waiting for the GUI image to update, the user capturing the reference image, the user typing in text into the test description, the test computer processing and inputting data associated with the creation of the latest line in the description. These steps take time to perform and complete.

Therefore, in the description creation process, the SUT will often be given sufficient time to process an instruction sent by the test computer, update its GUI to represent the execution of that instruction and send the updated GUI image to the test computer before the test computer performs the step of comparing the latest GUI image with the (now selected) reference image and send the instructions. This time lag experienced in the 'description creation mode' may cause performance issues when the completed test description is then run automatically on a further SUT (not in creation mode).

SUMMARY

According to an aspect of the present disclosure, there is provided a method for entering information into an automated test, wherein the automated test comprises a test description and is configured, when executed, to cause a test computer system to communicate with a system under test, and, wherein the system under test comprises one or more computer programs being executed upon a computer device; the method comprising the steps of: obtaining data associated with one or more time values; and, using one or more processor devices to: process the data to determine the information; and, enter the information into the automated test.

The test computer system may comprises at least one of the said one or more processor devices.

The method may comprise the step of: processing the data using a processor device of the test computer system.

The method may comprise the step of: entering information into the automated test using a processor device of the test computer system.

The test description may comprise one or more instructions, the method may comprise the step of: associating the information entered into the automated test with at least one of the said instructions.

The method step of obtaining data may comprise: obtaining a first time value; and, obtaining a second time value.

The method step of processing the data may comprise: comparing the first and second time values using at least one of the processor devices.

Any one or more of the first or second time values may be associated with a communication between the system under test and the test computer system.

The method may further comprise storing one or more of the time values.

The method as may further comprise the step of: storing data associated with the communication.

The method may further comprise associating the stored communication data with the corresponding stored time value.

The method may comprise the step of: sending, using a transmitter device, a first communication to the system under test; the first time value is associated with the first communication.

The method may comprise the step of: sending the first communication from the test computer.

The first time value may be associated with the sending of the first communication.

The first communication may comprise an instruction associated with an instruction contained within the test description.

The test computer system may comprise the transmitter device.

The method may comprise the step of: receiving with a receiver device a second communication; the second time value is associated with the second communication.

The test computer system may comprise the receiver device.

The method may comprise the step of: receiving the second communication at the test computer.

The second time value may be associated with the receiving of the second communication.

The second communication may comprise an image.

The image may comprise at least a portion of the GUI output of the system under test.

The second time value is obtained by: comparing the image with a reference image.

The method may comprise the steps of: sequentially receiving, in time, a plurality of second communications; each second communication: comprising an image; and being associated with a time value; determining the second time value by: comparing the image of at least one of the plurality of second communications with a reference image to identify an expected image; identifying the second time value from the said comparison.

Determining the second time value may comprise the steps of: comparing a plurality of images, from a plurality of corresponding second communications, with the reference image; and, identifying the second communication comprising both the expected image and the earliest time value.

Entering information into the automated computer test description may comprise entering time information.

Entering information may comprise entering a delay command.

The test description may comprise one or more lines of text.

Entering information may comprise the steps of: identifying a first line of text in the test description; and, entering the information in an adjacent line in the test description.

Entering information may comprise: identifying first and a second line of text in the test description; and, inserting a third line between the first and second line; the third line comprising the information.

The method may be configured such that the said identified first line of text in the test description comprises an instruction configured to cause the sending of the first communication to the system under test.

The method may be configured such that the test computer system comprises at least one of the said processor devices, the method comprising the step of: entering information into the automated test using a test computer processor device.

According to a first aspect of the present disclosure, there is provided a method of updating a test description forming part of an automated test, wherein the automated test is configured, when executed, to cause a test computer system to communicate with a system under test, and, wherein the system under test comprises one or more computer programs being executed upon a computer device, the method comprising the steps of: a) obtaining a first time value associated with the sending of an instruction contained within the test description from the test computer to the system under test; b) obtaining a second time value associated with the receiving of an image comprising at least a portion of a GUI output of the system under test at the test computer; and; using one or more processor devices to: c) compare the first and second time values to determine timing information; and d) update the test description using the timing information.

The first aspect may be modified in any suitable way as disclosed herein including but not limited to any one or more of the following.

In one embodiment, the test computer system comprises at least one of the said one or more processor devices. In one embodiment, the method comprises the step of: processing the data using a processor device of the test computer system.

In one embodiment, the method comprises the step of: updating the test description by entering information using a processor device of the test computer system.

In one embodiment, the test description comprises one or more instructions, the method comprising the step of: associating the timing information with at least one of the said instructions. In one embodiment, the method comprises storing one or more of the time values.

In one embodiment, the method comprises the step of: storing data associated with the instruction. In one embodiment, the method comprises associating the stored instruction data with the corresponding stored time value.

In one embodiment, the test computer system comprises a transmitter device. In one embodiment, the test computer system comprises a receiver device. In one embodiment, the second time value is obtained by: comparing the image with a reference image.

In one embodiment, the method comprises: e) sequentially receiving, in time, a plurality of images comprising at least a portion of a GUI output of the system under test associated with a time value at the test computer; and determining the second time value by: f) comparing at least one image with a reference image to identify an expected image; and g) identifying the second time value from the said comparison.

In one embodiment, determining the second time value comprises the steps of: h) comparing a plurality of images with the reference image, identifying the image comprising both the expected image and the earliest time value.

In one embodiment, updating the test description comprises entering time information into the test description. In one embodiment, updating the test description comprises entering a delay command into the test description. In one embodiment, the test description comprises one or more lines of text.

In one embodiment, updating the test description comprises: j) identifying a first line of text in the test description; and, k) entering the information in an adjacent line in the test description.

In one embodiment, updating the test description comprises: l) identifying first and a second line of text in the test description; and, m) inserting a third line between the first and second line; the third line comprising the information. In one embodiment, the said identified first line of text in the test description comprises an instruction configured to cause the sending of the first communication to the system under test.

In one embodiment, the test computer system comprises at least one of the said processor devices, the method comprising the step of: updating the test description by entering information into the automated test using a test computer processor device. In one embodiment, wherein, subsequent to step d), the method further comprises: n) utilizing the updated test description in an automated test.

In a second aspect of the disclosure there is provided a computer readable medium comprising instructions configured, when executed, to give effect to the method as described in the first aspect and any combination of optional features described in the first aspect.

In a third aspect of the present disclosure there is provided a computer system comprising: a computer readable medium described in the second aspect, and, a processor device configured to execute the said instructions on the said computer readable medium.

The third aspect may be modified in any suitable way as disclosed herein including but not limited to any one or more of the following.

The computer system may further comprise a storage device.

The computer system may further comprise a transmitter device configured for sending one or more communications to the system under test.

The computer system may further comprise a receiver device configured for receiving communications from the system under test.

The computer system may comprise a clock configured to identify the receiving and/or transmitting of a communication between the computer system and the system under test.

The computer system may further comprise a user interface configured to allow a user to interact with the system under test.

According to a fourth aspect of the disclosure there is provided a method for entering timing information into an automated test, wherein the automated test comprises a test description and is configured, when executed, to cause a test computer system to communicate with a system under test, and, wherein the system under test comprises one or more computer programs being executed upon a computer device; the method comprising the steps of: obtaining a first time value associated with the sending of a first communication from the test computer to the system under test using a transmitter device; obtaining a second time value associated with the receiving of a second communication from the system under test at the test computer using a receiver device; and, using one or more processor devices to: compare the first and second time values to determine the timing information; and, enter the timing information into the test description.

The fourth aspect may be modified in any suitable way as disclosed herein including but not limited to the optional features described in the first aspect.

According to a fifth aspect of the disclosure there is provided a testing system comprising a computer system as described in the third aspect and a system under test.

The above summary does not provide an exhaustive list of inventive concepts. Other inventive concepts may be present from different features or elements or different combinations of features or element described herein. In particular, the above optional features or elements can be incorporated where suitable, in any combination, into any of the examples or embodiments as presented herein.

BRIEF DESCRIPTION OF THE DRAWINGS

Embodiments of the present disclosure will now be described in detail with reference to the accompanying drawings, in which.

DETAILED DESCRIPTION

Figure 1:
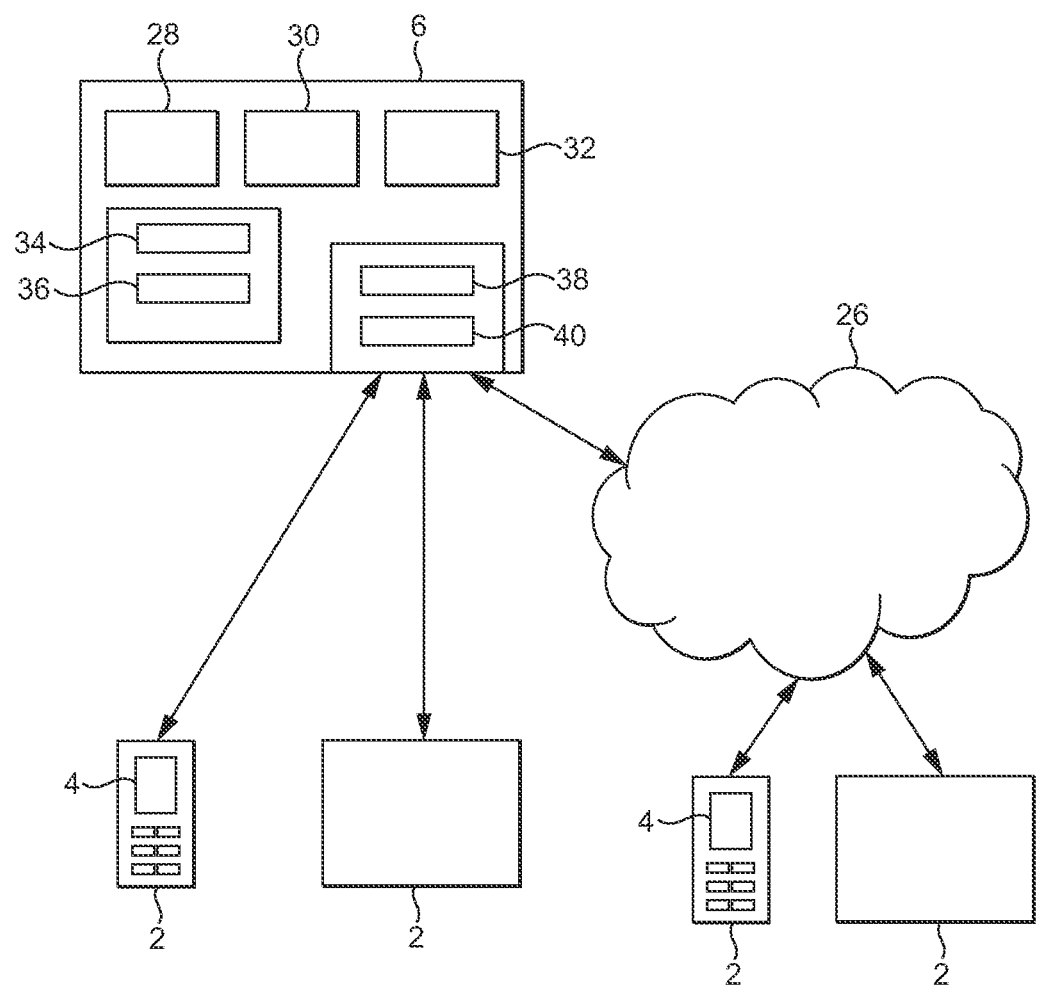
FIG. 1 shows an example of a test computer system that is in communication with several systems under test in accordance with various embodiments of the present disclosure.

There is presented herein methods for entering information into an automated test.

In one example of the methods disclosed herein, the method monitors the GUI 4 of a system under test (SUT) 2 for changes in the graphical output and records a history of the changes over time. These changes can then be correlated with user interface events occurring on the SUT 2.

Consider, for example, a user operating a test computer 6 communicating and interacting with an SUT 2 running Mac OS X. When the user clicks to launch a new application, the menu at the upper-left of the SUT screen 4 changes whilst other areas of the screen remain unchanged. By observing the screen 4, the method identifies and records those changes and the time at which the changes occurred. Over time the method may develop a complete history for every point/pixel of the screen 4, how many times that pixel has changed, what other regions of the screen 4 (for example a group of two or more pixels) changed at the same time and when those changes happened relative to various user input events.

Note that this may be done outside of having specific hooks or knowledge of the SUT 2 or its display mechanics. The changes may be observed entirely by comparison of the screen 4 from one moment to the next from a stream of images.

Using the above history data allows the method to determine how long until an expected "reaction" on the SUT 2 occurred and accordingly, how long an automated test should expect to look for them. Further, by storing this history, the method can also build expected (or typical) performance data and then provide feedback as to whether this is different when changes occur on the SUT 2 (new versions of a program, changes to the network, etc.) Another application of this technology is to use these changed regions to provide "hinting" as to what regions of the screen 4 represent user-interface elements. This would be useful for automatically capturing reference images.

A further application for the method is the ability to optimize searches for a desired image (an expected image) on the SUT 2. If the method searches for an image on the SUT GUI 4 and determines that it is not there at the time but searches again at some point in the future, the method can limit the further searching to only the changed regions outset by the size of the original image. This leads to significant gains when the image or number of changes to the SUT 4 is small.

The methods presented herein may be performed upon the executing of instructions stored upon one or more computer readable media. A system is also provided that is configured to perform the method/s as described herein.

The SUT and Test System

The automated test is configured when executed, to cause a test computer system 6 to communicate with an SUT 2. The communication between the SUT 2 and the test computer system 6 is intended to mean one or more pieces of data is transferred, either directly or indirectly, between the two entities, i.e. data sent directly or indirectly from the test computer system 6 to the SUT 2 and/or data sent directly or indirectly from the SUT 2 to the test computer system 6.

By communicating with the SUT 2, the test computer system can interact with the SUT, for example by receiving GUI 4 images and/or sending commands to control the SUT. The automated test description is typically configured, when executed by a test program, to test the functionality and/or behavior of an SUT. A test computer communicable with several SUTs is shown in FIG. 1.

The term "test description" may also be termed throughout the application as an "automated test description".

Typically, a "test description" forms part of an "automated test". The test description is typically lines of text or other characters that typically contain instructions, that when executed by the test program, cause the SUT to perform particular actions or execute functions. An instruction in the description can include one or more standard commands and/or one or more other pieces of information or data. For example, the command "Typetext" may be followed by the words "This is a test". The test program running the automated test would execute the standard command "Typetext" to cause the SUT to type the words "This is a test" into a particular text entry box on the SUT GUI 4.

The automated test may have further metadata associated with the description. Such metadata may be, an image associated with a particular instruction in the description. The test may be stored using one or more storage device or computer readable media as described herein.

For the purposes of this application, when reference is made to the test program running the test description, this is taken to mean the running of the automated test.

The SUT 2 comprises one or more computer programs being executed upon a computer device.

The SUT 2 may be remote from the test computer system 6. The term 'remote' is intended to mean that the computer system or device is physically separate to the test computer system 6 such that when the test computer system and remote computer system interact, one or more transmitter and receiver devices are used to send and receive data over one or more communication channels. The communication channel may be any suitable channel using any of electrical, electromagnetic or optical signals.

Figure 2:
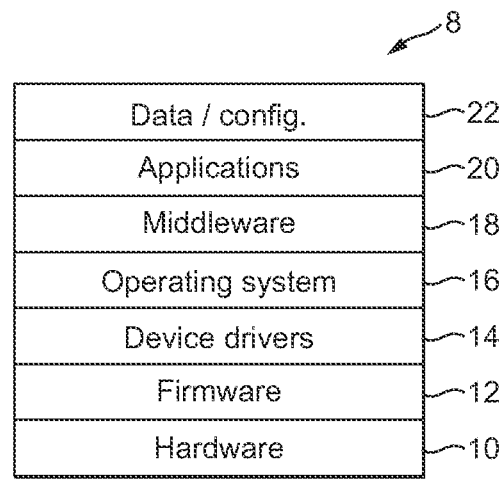
FIG. 2 shows an example of a hardware/software stack model representation for a system under test in accordance with various embodiments of the present disclosure.

The SUT 2 can be any computing system or device running one or more computer programs. FIG. 2 shows an example model of a hardware/software stack 8 for an SUT 2. The test computer system 6 can control features or aspects of any of these layers by interacting with the SUT 2. The SUT 2 in principle can include any one or more parts of the hardware/software stack 8 of the system being tested 2, i.e. the hardware 10, firmware 12, device drivers 14, operating system 16, middleware 18, applications 20 and data/config 22. Typically an SUT 2 will at least comprise hardware 10 and an operating system 16. FIG. 2 is only an example of a hardware/software stack model 8. Other models with further details and layers may also be used to define an SUT 2. The term 'computer program' is taken to mean any of (but not necessarily limited to) an application program 20, middleware 18, an operating system 16, firmware 12 or device drivers 14 or any other medium supporting executable program code.

The term 'hardware' 10 is taken to mean any one or more of the collection of physical elements that constitutes a computer system/device such as, but not limited to, a processor, memory device, communication ports, input/output devices.

The term 'firmware' 12 is taken to mean any persistent memory and the program code/data stored within it, such as but not limited to, an embedded system.

The term 'device drivers' 14 is taken to mean the one or more programs that operate to control a particular type of device incorporated into or attached to the computer device/system.

The term 'operating system' 16 is taken to mean the one or more pieces, often a collection, of software that manages computer hardware and provides common services for computer programs.

The term 'middleware' 18 is taken to mean the computer software that provides services to software applications beyond those available from the operating system 16.

The term "applications" 20 is taken to mean the computer software that causes a computing device or system to perform tasks that are typically beyond the running of the computer itself.

The term 'data/config.' 22 is taken to be any other information provided to the SUT 2 that can be used to affect its running or output, for example data input into the application program 20.

An SUT 2 may comprise a different physical device to another SUT 2 as shown in FIG. 1. For example, the SUTs may be different physical computing devices running the same application program 20 using the same or different application program 20.

Alternatively, an SUT 2 may differ from another SUT 2 simply by running a different operating system 16 and/or different version of one or more application programs 20. For example, a first SUT 2 may be a PC (i.e. the computer hardware) running an operating system 16 and a first version of an application program 20, whereas a second SUT 2 may be the same hardware 10 as the first SUT 2, running the same type and version of the operating system 16 but running a second, updated version of the application program 20. In principle, one SUT 2 may differ from another SUT 2 by virtue of any different hardware/software configuration. For example any change in any one or more of the layers in the stack 8 of FIG. 1 from hardware 10 to application program 20, may give rise to a different SUT 2.

Typically when the test computer device interacts with the SUT 2, it does so using a test program that executes the test description 24. Typically the test program is hosted on the test computer system 6. The description 24, when run (executed) by the test program, typically causes the SUT 2 to be controlled by the test computer system 6. For example, a line in the test description 24 run by the test program with the phrase "click button X" will cause button 'X' on the GUI 4 of the SUT 2 to be selected and the operation associated with the selection of that button to be started upon the SUT 2.

FIG. 1 shows an example of a test computer system 6 in communication with several SUTs 2. Two of the SUTs 2 are being communicated with directly, for example using infrared or blue tooth communications, or over a local wired or wireless network, whilst two other SUTs are being communicated with via the internet 26.

The test computer device/system 6 may be any suitable computer device, system, collection of computing devices or collections of computing systems. The test computer system 6 may comprise any one or more of: one or more processors 28; one or more controller devices 30; one or more memory devices 32; one or more user input devices 36; one or more output devices 34 such as, but not limited to, a GUI; one or more communication devices such as a transmitter 38 and/or a receiver device 40.

Any one or more of the processor 28, controller 30, receiver 40, transmitter 38, or memory 32 may be a physical, non-transitory, device or apparatus. The devices/apparatus may be electronic, opto-electronic or optical.

The processor 28 may, in principle, be any suitable processing device such as, but not limited to, a microprocessor, an application-specific instruction-set processor, a graphics processing unit (GPU/VPU), a physics processing unit (PPU), a digital signal processor, a network processor, a front end processor. Examples of processors include, but are not limited to, an Intel™ processor, an AMD™ processor.

The controller 30 may be any suitable controller including any one or more of a controller chip, a controller board, a mainframe controller, an external controller or any other suitable controller. The controller may be, for example, a micro-controller.

The memory 32 may, in principle be any suitable memory including any one or more of: mechanical memory such as, but not limited to, magnetic tape drive, hard-drive, optical drive; volatile and non-volatile memory such as, but not limited to, RAM, DRAM, SRAM, SDRAM, T-RAM, Z-RAM, TTRAM, ROM, Mask ROM, PROM, EPROM, EEPROM, NVRAM.

Figure 6:
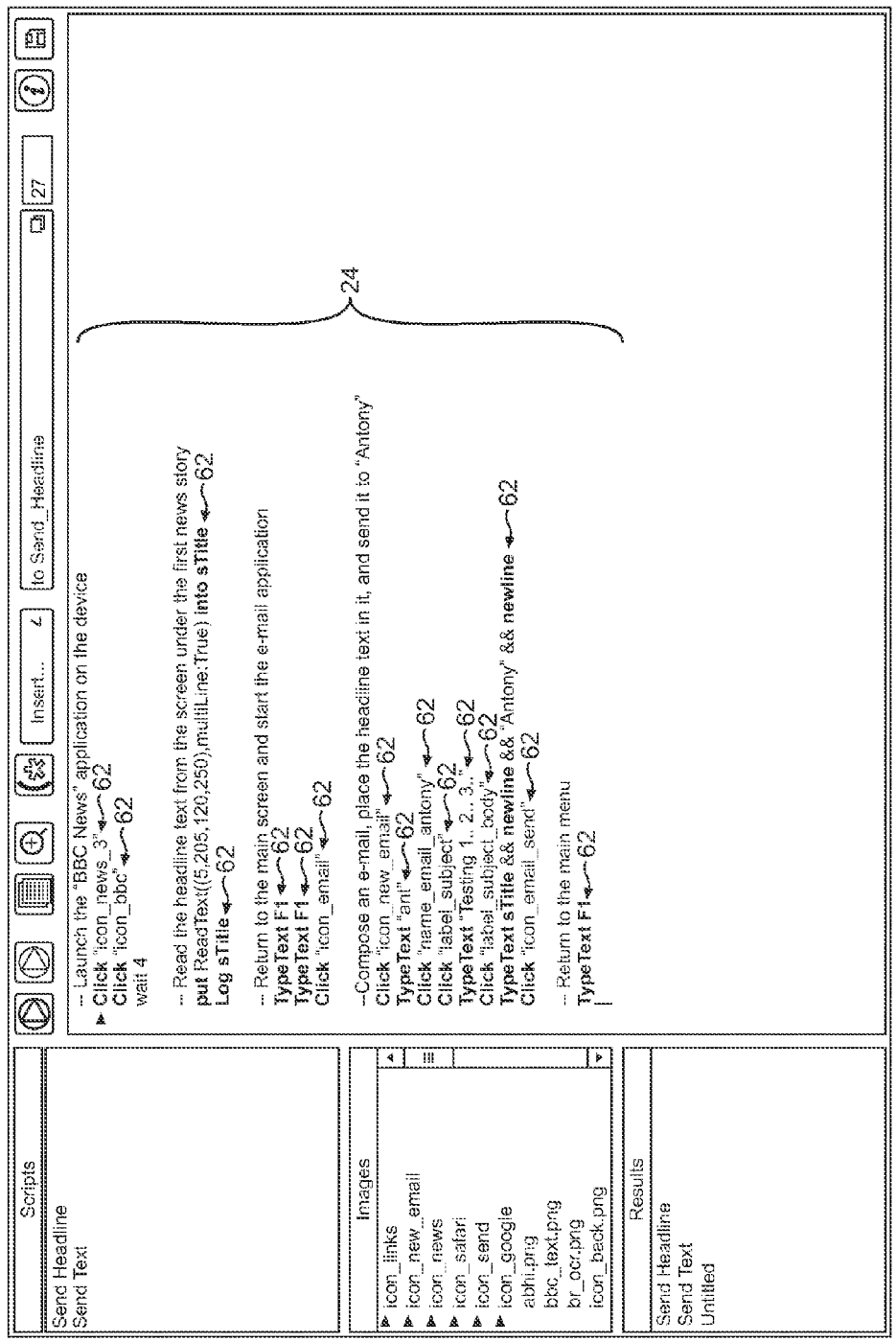
FIG. 6 shows an example of a test description in accordance with various embodiments of the present disclosure.

FIG. 6 shows an example of a test description 24 run within a test program. The test description 24 comprises multiple lines of text, numbers or other symbols that are typically executed by the test program in a sequential manner.

The description 24 may be written in any suitable scripting language, for example SenseTalk™. Preferably the description is loadable onto a carrier device such as a disc, memory stick or any other suitable electronic data carrier.

Using GUI Images

The test program may utilize one or more GUI 4 images received directly or indirectly from the SUT 2. Typically the GUI 4 images are "snapshots" of the output of the GUI 4 of the SUT 2 at a particular time. Typically these snapshots are saved as a graphical image file, for example a bitmap, gif or jpeg file. The GUI 4 images may be a snapshot of the whole GUI 4 or one or more portions of the GUI 4. GUI snapshots may be only portions of the GUI image that have changed since a previous GUI image was sent.

It is understood that a test program is typically used to execute the test description 24. However, the functionality required to execute the test description 24 may be hosted by an operating system or any other software or dedicated hardware, for example the test description 24 may be a standalone executable file itself.

The SUT 2 may send these GUI images to the test computer system 6 automatically upon an initial command to start sending the images. Additionally or alternatively the SUT 2 may send one or more GUI images upon a command sent from the test computer system 6. Additionally or alternatively the SUT 2 may send one or more GUI images upon a command sent to the SUT 2 resulting from an instruction from the test program, and/or the test description 24.

The GUI images may be sent continuously by the SUT 2 at a particular update frequency, for example the SUT 2 may send a new GUI image to the test computer every 0.3 seconds.

Example of Receiving GUI Images

An example of what images a test computer 6 could receive from an SUT 2 is described as follows with reference to FIGS. 3, 4a, 4b, 5a, 5b. Any of the principles and details described in this example may be combined with any of the methods or systems described herein.

In this example the SUT 2 only sends images corresponding to the areas of the GUI 4 output that have changed since the last GUI images were sent to the test computer 6.

In this example, the rate at which the SUT 2 sends new GUI images to the test computer 6 is every 0.3 seconds, hence GUI images may be sent to the test computer 6 at 0.3, 0.6. 0.9, 1.2 seconds etc. In principle, the GUI update could occur at any frequency or could be at an intermittent update rate (i.e. not a constant frequency).

Figure 3:
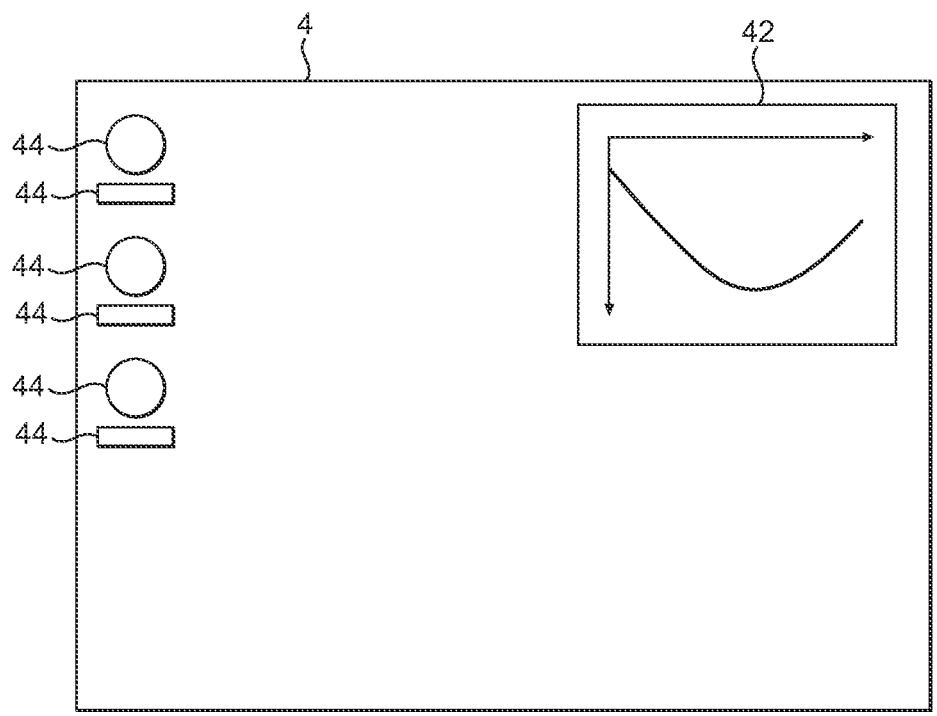
FIG. 3 shows an output from the GUI of an SUT at a particular point in time in accordance with various embodiments of the present disclosure.

FIG. 3 shows an example of the output from the GUI 4 of an SUT 2 at a particular point in time 't=0 seconds'. This GUI 4 output has a graph 42 near the top right hand corner showing a curve and a negative Y axis, and six image objects 44 along the left hand edge of the GUI 4. This GUI 4 output is the first output that the test computer 6 receives during this testing session. Because there are no previous GUI images for this test session, all the pixels in the GUI 4 output are new, therefore the whole GUI 4 output is sent as a single image to the test computer 6. In principle, this whole GUI 4 output may be sent as several images that when combined, covered the whole GUI 4 output at this time.

Figure 4A:
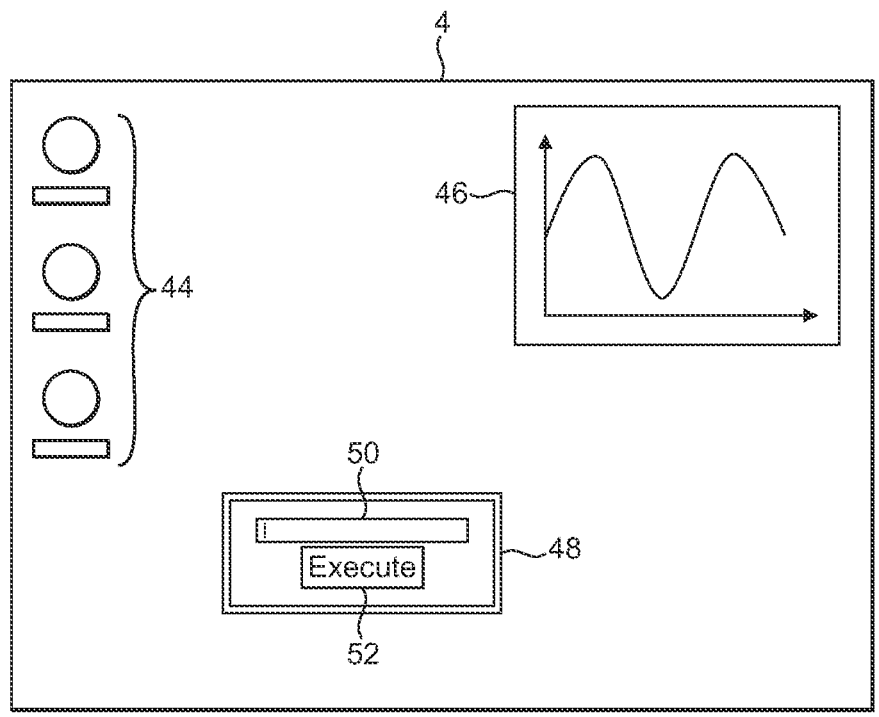
FIG. 4a shows the output from the same GUI of FIG. 3 at a first further point in time in accordance with various embodiments of the present disclosure.

FIG. 4a shows the GUI 4 output from the same SUT 2 at a first further point in time where the test computer 6 has sent an instruction to the SUT 2 to perform a task. The first further point in time in this example is 't=5 seconds'. During the time spanning t=0 seconds to t=5 seconds, several cycles of the GUI image update period (0.3 seconds) have passed, however since no other changes to the pixels in the GUI 4 output have been made, no further GUI images have been sent to the test computer 6.

Figure 4B:
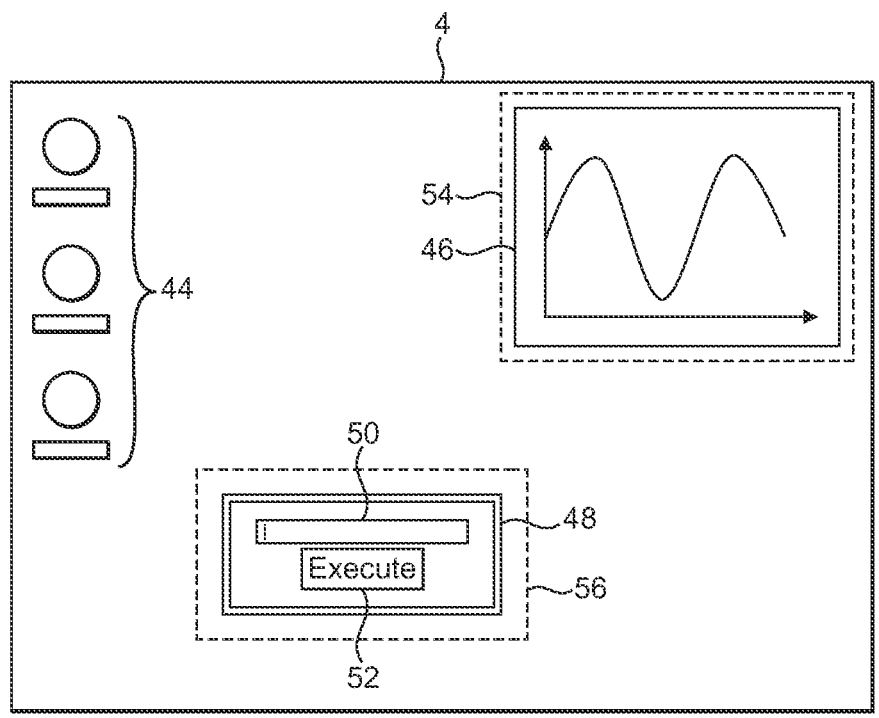
FIG. 4b shows the output of FIG. 4a together showing the areas of the GUI that are sent as GUI images to the test computer in accordance with various embodiments of the present disclosure.

The result of the SUT 2 processing data according to the task has led to the GUI 4 to output, at time t=5 seconds, a different graph 46 in the top right corner and to introduce a new dialogue box 48 with a text insertion box 50 and an "Execute" button 52. The six image objects 44 on the left hand GUI 4 edge remain the same. At the next cycle of GUI image updates being sent to the test computer 6 (occurring at t=5.1 seconds), the SUT 2 sends two GUI images, as shown in FIG. 4b. The first GUI image 54 is a first set of pixels covering and including the new graph 46. The second GUI image 56 is a second set of pixels including at least all of the pixels on the GUI 4 that show the new dialogue box 48.

Figure 5A:
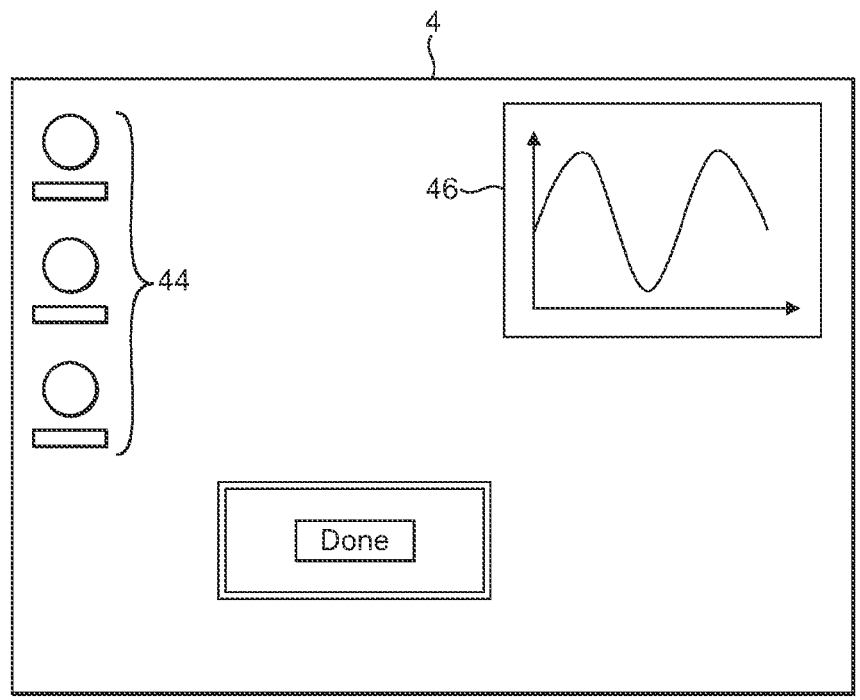
FIG. 5a shows the output from the same GUI of FIG. 3 at a second further point in time beyond the first further point in time in accordance with various embodiments of the present disclosure.

FIG. 5a shows the output from the same GUI 4 of FIGS. 3, 4a, 4b at a second further point in time beyond the first further point in time. The second further point in time in this example is 't=10 seconds'. At this point in time the test computer 6 has sent another command to the SUT 2 to "click" the execute button 52. The resulting processing by the SUT 2 has led to the GUI 4 to remove the text insertion box 50 and "Execute" button 52 from the dialogue box 48 and replace it with rectangular box with the word "Done".

Figure 5B:
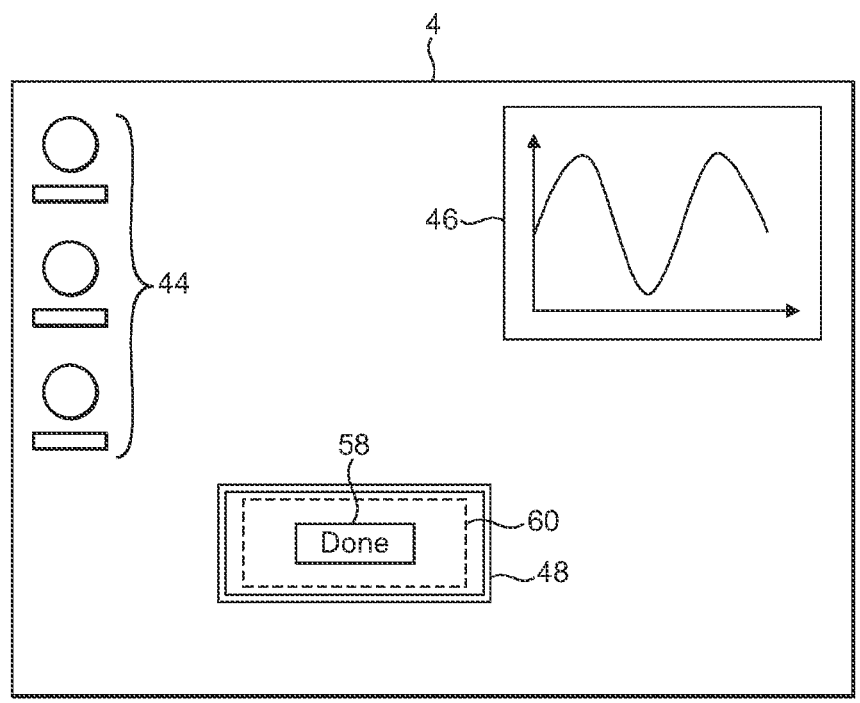
FIG. 5b shows the output of FIG. 5a together showing the areas of the GUI that are sent as GUI images to the test computer in accordance with various embodiments of the present disclosure.

FIG. 5b shows the GUI 4 output of FIG. 5a together with the selected GUI image to be sent to the test computer 6. Again we assume that no other changes to the pixels in the GUI 4 output have been made between t=5 seconds and t=10 seconds therefore no further GUI images have been sent to the test computer 6. The GUI image 60 sent to the test computer 6 that is shown in this figure is not simply the box with the word "Done", but includes other pixels surrounding the "Done" box 58 that have change due to the removal of the "Execute" button 52 and the text insertion box 50. This GUI image 60 is then sent at the next cycle of the image update period occurring at t=10.2 seconds.

The GUI images provided in the image updates according to the example above and any of the methods/systems described herein, may in principle be one or more images. The images may be rectangular or take any other shape and be in any image format such as '.bmp,' '.jpeg', '.png' file format.

The images may be based on a grid system wherein the GUI 4 output is notionally divided into sections for GUI image output. When a pixel has changed in that section then the whole section is output as a GUI image.

The GUI updates sent to the test computer 6 therefore provide a time sliced update of what pixels in the GUI 4 output have changed at a particular point in time.

The GUI images received from the SUT 2 may be stored by one or more memory elements 32. The memory elements 32 may be housed within and/or are part of the test computer system 6. Additionally or alternatively one or more memory elements may be housed remotely from, but in communication with, the test computer system 6.

Typically, at a given line in the description 24, the test computer/program will select the latest GUI image stored by the memory element and perform an image analysis on the GUI image to find an expected image. The expected image may be the whole GUI image or one or more parts of the GUI image.

The GUI image that the test computer 6 compares, to find the expected image may, in some situations, only include the one or more sub sections of the GUI 4 output most recently sent by the latest GUI image update from the SUT 2. Alternatively, the GUI image that is compared may be a composite image based upon all the GUI images sent by the SUT 2 that represent the current whole GUI 4 output.

The expected image may be an image that indicates a particular action has been accomplished by the SUT 2, for example, the expected image may be part of a dialogue box with the phrase "Congratulations you have created your test file". In the example shown in FIG. 5a, the GUI image 60 with a box incorporating the word "Done" 58 is received by the test computer 6 and compared against a reference image of the word "Done" without the surrounding box. The comparison provides a match and the expected image "Done" 58 has been identified.

The expected image may be an image that represents an interactive feature on the GUI 4 of the SUT 2 that the test program wishes to utilize. An example of an interactive GUI 4 feature is a 'Start' button, which when selected and activated on the SUT GUI 4 causes a pop-up menu to appear that the test program can then further utilize in the testing of the SUT 2.

When performing the image analysis to identify the expected image, the test program uses existing reference images that are associated with the expected graphical make-up of the expected image. Typically these reference images will be similar or identical to the expected image such that the test program can search the GUI image for a graphic similar to or identical with the reference image.

The test program may utilize various methods of performing this image analysis and may try to 'match' the reference image to at least a portion of the GUI image/s using any suitable image analysis technique. This may include, for example, having to re-size or rotate the reference image to find a match.

Expected images contained within the GUI image may be associated with "events" that are activate-able within the SUT 2 as discussed above. For example the expected image of a start buttons. These "events" may be utilized by the test program. Each event is executable in the SUT 2 by the selection of a particular one or more activating pixels or "hotspots". The hotspots may be within the expected image or outside of the expected image. For example, the hotspot may be one of the pixels making up the 'a' of the word "Start".

Entering Information into the Automated Test

The following describes non limiting examples of how information may be entered into an automated test according to the methods and systems described herein. These examples may be modified according to any suitable feature, principle or method step as described herein.

The information entered into the automated test may be included within the test description 24 and/or any metadata accompanying the test description 24. Typically the information is entered during 'description creation mode', i.e. when the user initially creates the description 24, however the information may, in principle, be entered at any time.

The information may be used to provide an appropriate delay in the test between executing successive lines 62 in the test description 24. As instruction lines 62 are created and executed in the 'description creation mode', the SUT 2 is typically given sufficient time to: process the instruction; update its GUI 4 with the image indicating the instruction has completed; and send a GUI image update to the test computer 6 before the user creating the description 24 begins to create a new instruction line 62. In situations where the user manually creates reference images for the test by selecting regions on the SUT GUI 4 (via selecting portions of the one or more of the GUI images presented to him/her on the test computer 6), the SUT 2 will, by default, always be given time to update its GUI image because the user cannot create the required reference image until the SUT 2 sends such an image to the test computer via a GUI image update.

When the test is completed and then run automatically on the same or a different SUT 2, the speed of execution of the lines 62 in the test description 24 may occur faster, in some instances, than the SUT 2 can process the instructions it receives, update the GUI 4 based on an instruction and send the GUI image update to the test computer 6. This time lag may be attributed to various factors including, but not limited to, the computing power of the SUT 2 and any communication delays between the test computer 6 and the SUT 2.

An example of the above situation is now described where a completed test description 24 is automatically run on an SUT 2. The test description 24 has an instruction line 62 'Click "open text box" ', followed by an instruction line 62 'Typetext "243" ' The effect of the two adjacent instructions is intended to firstly make the SUT 2 open a new text box on the SUT GUI 4 and then, once opened, type in the numbers 243 into the box.

When executing the description 24, the 'Click "open text box"' instruction is firstly sent to the SUT 2. However, without a suitable delay between the two instruction lines 62 in the test description 24, the SUT 2 does not have time to process the instruction, create the dialogue box and send the GUI image update with the new box, before the next instruction line 62 'Typetext "243"' is initiated. The effect of the early initiation means that the test computer 6 cannot provide sufficient instructions to the SUT 2 as to where to start typing the text 243, because the "expected image" of the text box has not yet appeared.

The methods described herein therefore introduce information into the test to circumvent this issue. The introduction of the information into the test, together with the how the test is configured to use the information and interact with the SUT 2 may be used to provide a suitable delay to allow subsequent steps in the test to execute correctly.

An Example of Entering Information

Figure 8:
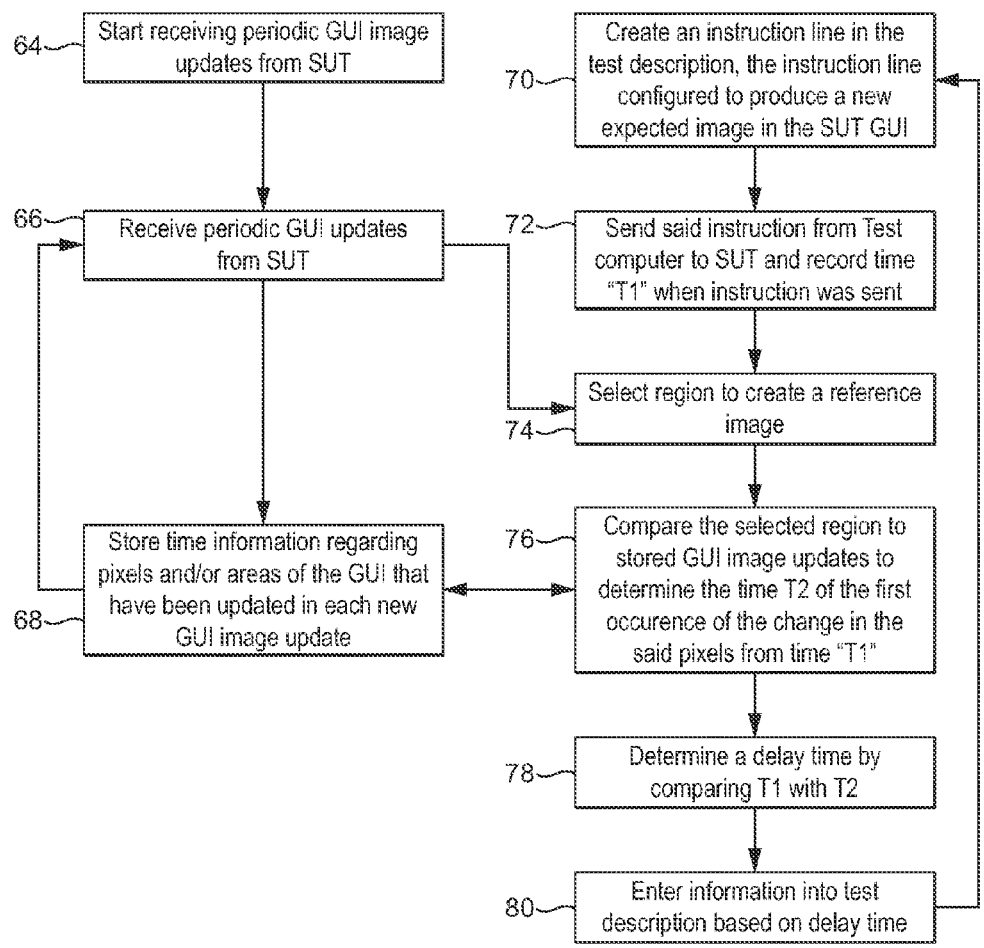
FIG. 8 shows an example of a method for entering information by comparing two times 'T1' and 'T2' in accordance with various embodiments of the present disclosure.

FIG. 8 shows an example of a method for entering information into an automated test. The method is being performed during the creation of the test description 24 (i.e. in 'description creation mode'). A test computer 6 is in communication with an SUT 2 and starts 64, 66 to receive periodic GUI image updates from the SUT 2 (for example every 0.2 seconds).

The user continually sees on the test computer GUI 34 what is currently being displayed according to the last GUI image update from the SUT 2. At any one time, the user therefore sees, on the test computer GUI 34, an output made up from the latest version of each pixel. Because not all pixels are updated in each GUI image update, the pixels seen on the test computer GUI 34 may represent the pixels from several SUT GUI image updates.

Each time the test computer 6 receives a GUI update it obtains data by recording 68 the time the GUI update was received at the test computer 6 (for example recording the time on the test computer's local clock), and what areas of the GUI image/what pixels have been updated at this time. In this manner, the method keeps a time sliced record of the GUI image updates/changes.

Whilst the GUI image updates are being continually sent to the test computer 6, the user is creating the description 24 using the test computer 6 by navigating the SUT 2 and creating 70 successive instruction lines 62 in the description 24 corresponding to the actions taken. Certain actions that the user takes to interact with the SUT 2 may cause a change in the GUI 4 output, which are reflected in the corresponding instruction line 62 that gets created in the description 24 as a result. The instruction line 62 created, when subsequently run automatically (not in description creation mode), will attempt to re-create the user action and therefore also look to make the same or similar change to the GUI 4 of the SUT 2. As the user navigates the SUT 2 when creating a new instruction line 62, a communication is sent 72 from the test computer 6 to the SUT 2 to perform that action. For example, the current GUI image updates received by the test computer 6 show an executable button in the left hand corner of the SUT GUI 4 underneath where the user has already positioned the SUT 2 mouse cursor. The user then clicks the mouse button on the test computer 6. This causes the test computer 6 to send a command to the SUT 2 to click that particular button of the SUT GUI 4. At the same time, the command "Click_button" is created in a new line in the test description 24. The time that the instruction was sent to the SUT 2 is recorded 72 by the test computer as T1.

Sometime later, the SUT 2 actually clicks the button and a portion of the SUT GUI 4 output changes as a result of executing the function associated with the button, for example, the clicking of the button causes a dialogue box to appear. The next GUI image update after this GUI 4 change is sent with an image of the new dialogue box. The test computer 6 receives this GUI image update and records a time T2 upon receiving this update. The user then spends, for example. 5 seconds manually selecting 74 at least a portion of the GUI image received as a reference image which is stored as metadata associated with that instruction line 62. During this 5 seconds, the SUT 2 has sent twenty five further GUI image updates to the test computer 6. The method then identifies the first GUI image update, since time T1, that included the pixel changes of the pixels selected in the reference image. The method identifies the update occurring at T2 as that particular update.

The time values T1 and T2 are then compared 76, and the difference in time between T1 and T2, attributable to a delay 78, is provided as at least part of the information to be entered 80 into the test description 24. For example, the time difference between T1 and T2 was calculated to be 2 seconds, therefore the method enters an instruction line "waitfor 2 seconds" immediately after the "Click_button" instruction line.

The entering of this information into the description 24 ensures that when the completed test description 24 is subsequently run on another SUT 2 in fully automated mode (rather than "description creation mode"), the next instruction line 62 created by the user interacting with the SUT 2 does not execute until 2 seconds after the "Click_button" command executes, thus giving the SUT 2 sufficient time to process the "Click_button" command and send a GUI image update to the test computer 6. The portion of the description 24 described above may therefore be written as follows:
Click_button
Waitfor 2 seconds
"Waitfor" Commands In one non-limiting example of entering information into the automated test, a 'wait for' command 82 is inserted after a particular instruction line 62 of the test description 24. The "wait for" command 82 in the instruction line 62 of the test description 24 is a command recognized by the test program that gives the effect of delaying the progress of execution of the next line 62 by a set amount of time. The set amount of time may be located in the instruction line of the test description 24 or as metadata accompanying or associated with the test description 24.

Appropriate 'wait for' commands 82 may be inserted after a particular instruction line 62 has been created but before the next instruction line 62 is created. Alternatively or additionally, 'wait for' commands 82 may be inserted into the test description 24 of the automated test once all of the instruction lines 62 have been created.

'Wait for' commands 82 may be inserted at appropriate points within the test description 24. For example, after 'type text' statements, 'click' commands, or any other command that causes the test computer 6 to search GUI image updates for expected images with a reference image.

The 'wait for' 82 instruction line 62 in the description 24 typically comprises the 'wait for' command 82 together with accompanying information associated with the delay that the test computer should 'wait for' before executing the next instruction line 62. The command "waitfor" 82 is one example of a command that can be used to provide a delay between subsequent instruction lines 62 in a test description 24. In principle, any similar command that, when executed, causes a delay in the progress of instruction line execution may be used. This could be a similar command with different syntax, a jump to a delay subroutine or even a list of commands and/or non-command text in the description 24 that has the effect of producing the delay.

The information accompanying the 'wait for' command 82 that the test computer 6 uses to delay the execution of the next instruction line 62 is based on data that the method has previously obtained. The information may be timing information, such as "1 second". For example the whole instruction line to give effect to the required delay may be "waitfor 1 second".

Figure 7A:
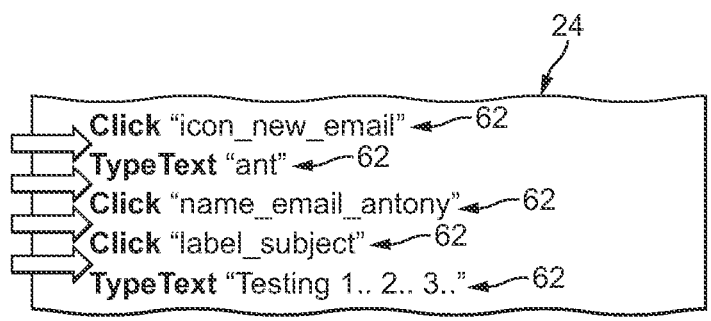
FIG. 7a shows a portion of the test description of FIG. 6 with arrows indicating where the a 'wait' statement may be inserted in accordance with various embodiments of the present disclosure.
Figure 7B:
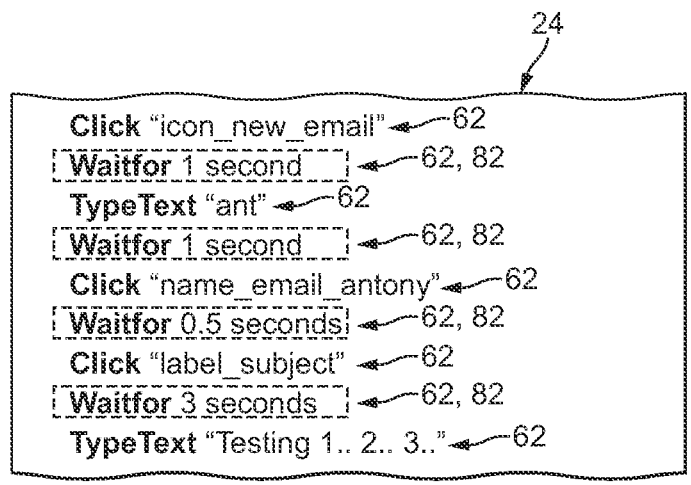
FIG. 7b shows the portion of the test description of FIG. 7a with 'waitfor' statements inserted in accordance with various embodiments of the present disclosure.

FIG. 6 shows an extract from a test description 24 of an automated test. The description 24 contains multiple instruction lines 62 with different commands. FIG. 7a shows an excerpt from the test description 24 of FIG. 6 together with arrows indicating where "waitfor" 82 instruction lines may be introduced according to the methods described herein. FIG. 7b shows the same excerpt of the description 24 of FIG. 6 with appropriate "waitfor" 82 instruction lines introduced into where the arrows pointed in FIG. 7a. In this example the method has inserted new "waitfor" 82 instruction lines in between two existing instruction lines 62. The waitfor command together with the appropriate delay information is therefore located adjacent the existing instruction line 62 that the test needs to wait to complete before executing the subsequent instruction line 62.

When the test description 24 is then run automatically, with the waitfor 82 commands entered into the description 24, the appropriate image of SUT GUI 4 is more likely to have been sent to and received by the test computer 6 before the next instruction line 62 is executed. Therefore, the next instruction line 62 can be executed properly without returning a failure because the test computer 6 can direct the SUT 2 to start typing in the correct place on the SUT GUI 4. If however the next line 62 in the description 24 executes after the previous 'wait for' 82 statement and still cannot perform its function properly because the GUI 4 has not been updated with the required image, the test computer 6 will return a failure. This may occur for example when the SUT 2 may have malfunctioned. Thus, the automated test fails when the SUT 2 does not update the GUI 4 in the time frame expected. The failure of the test to execute at a particular point may therefore be attributed to an actual failure of the SUT 2 rather than the test running too fast for the SUT 2 to keep up with.

Another use of the information is within the metadata accompanying the test description 24. An example of this could be that the test computer 6 continually searches GUI updates for the expected image with the reference image for a particular time period set by the time derived information. If the test computer 6 does not find the expected image during this time period then it may signal a failure to the user before the test computer 6 executes the next instruction line 62 of the test description 24.

Obtaining Data Associated with One or More Time Values.

The following describes non limiting examples of how information may be obtained according to the methods and systems described herein. These examples may be modified according to any suitable feature, principle or method step as described herein.

The information is derived by obtaining data that is associated with one or more time values and processing that data to determine the information. This data may be time values such as a time recorded on a time measuring device or system (for example an internal computer clock). The data may also be other data associated with time values such as information from which a time value may be extracted, for example information detailing the speed/performance of the SUT 2. For the purposes of the examples described below the data associated with one or more timing values is referred to as 'timing data'.

Typically the timing data is obtained during 'description creation mode', i.e. when the user initially creates the description 24, however the timing data may, in principle, be obtained at any time, for example re-running the completed description 24 and collecting the timing data.

The timing data may be processed by one or more processors, for example a processor 28 contained within the test computer system 6. Typically the timing data is processed during 'description creation mode', i.e. when the user initially creates the description 24; however the timing data may in principle be processed at any time.

In one example the timing data may comprise one or more time values. Each piece of timing data may be associated with a particular event or action; for example, timing data may be associated with the sending of a communication between the test computer 6 and the SUT 2.

One or more pieces of the timing data may be stored using a storage device 32. When stored, any one or more pieces of timing data may be stored such that it is referenced to a further piece of information such as an image being sent to the test computer 6 or an instruction being sent to the SUT 2. The further information may be stored with or have a linking reference to the timing data. The storing of the timing data and other information may be facilitated by any suitable storage device 32 (such as a memory device) and/or software (such as a database).

In one example, the method stores time values associated with the sending and/or receiving of: instructions from the test computer 6 to the SUT 2, and GUI image updates sent from the SUT 2 to the test computer 6.

The methods described herein may be embodied in one or more pieces of software. The software is preferably held or otherwise encoded upon a memory device such as, but not limited to, any one or more of, a hard disk drive, RAM, ROM, solid state memory or other suitable memory device or component configured to software. The methods may be realized by executing/running the software. Additionally or alternatively, the methods may be hardware encoded.

The method encoded in software or hardware is preferably executed using one or more processors. The memory and/or hardware and/or processors are preferably comprised as, at least part of, one or more servers and/or other suitable computing systems.

Variations of the above embodiments will be apparent to the skilled person. The precise configuration of hardware and software components may differ and still fall within the scope of the present disclosure. Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

What is claimed is:

1. A method of updating a test description forming part of an automated test, wherein the automated test is configured, when executed, to cause a test computer system to communicate with a system under test, and, wherein the system under test comprises one or more computer programs being executed upon a computer device, the method comprising:
obtaining a first time value associated with the sending of an instruction contained within the test description from the test computer to the system under test;
obtaining a second time value associated with the receiving of an image comprising at least a portion of a GUI output of the system under test at the test computer; and
using one or more processor devices to:
compare the first and second time values to determine timing information; and
update the test description using the timing information.

2. The method as claimed in claim 1, wherein the test computer system comprises at least one of the said one or more processor devices.

3. The method as claimed in claim 2, comprising the step of:
processing the data using a processor device of the test computer system.

4. The method as claimed in claim 2, comprising the step of:
updating the test description by entering information using a processor device of the test computer system.

5. The method as claimed in claim 1, wherein the test description comprises one or more instructions, the method comprising the step of:
associating the timing information with at least one of the said instructions.

6. The method as claimed in claim 1, further comprising the step of:
storing one or more of the time values.

7. The method as claimed in claim 1, further comprising the step of:
storing data associated with the instruction.

8. The method as claimed in claim 7, further comprising the step of:
associating the stored instruction data with the corresponding stored time value.

9. The method as claimed in claim 1, wherein the second time value is obtained by:
comparing the image with a reference image.

10. The method as claimed in claim 9, comprising:
sequentially receiving, in time, a plurality of images comprising at least a portion of a GUI output of the system under test associated with a time value at the test computer; and
determining the second time value by:
comparing at least one image with a reference image to identify an expected image;
identifying the second time value from the said comparison.

11. The method as claimed in claim 10, wherein determining the second time value comprises the steps of:
comparing a plurality of images with the reference image, identifying the image comprising both the expected image and the earliest time value.

12. The method as claimed in claim 1, wherein updating the test description comprises entering time information into the test description.

13. The method as claimed in claim 1, wherein updating the test description comprises entering a delay command into the test description.

14. The method as claimed in claim 1, wherein the test description comprises one or more lines of text.

15. The method as claimed in claim 14, wherein updating the test description comprises:
identifying a first line of text in the test description; and
entering the information in an adjacent line in the test description.

16. The method as claimed in any of claim 14, wherein updating the test description comprises:
identifying first and a second line of text in the test description; and,
inserting a third line between the first and second line; the third line comprising the information.

17. The method as claimed in claim 16, wherein the said identified first line of text in the test description comprises an instruction configured to cause the sending of the first communication to the system under test.

18. The method as claimed in claim 1, wherein the test computer system comprises at least one of the said processor devices, the method comprising the step of:
updating the test description by entering information into the automated test using a test computer processor device.

19. The method as claimed in claim 1, wherein, subsequent to updating the test information, the method further comprises:
utilizing the updated test description in an automated test.

20. A non-transitory computer readable medium comprising instructions that when executed by a processor of a test computer system, cause the processor to:
obtain a first time value associated with the sending of an instruction contained within the test description from a test computer to the system under test;
obtain a second time value associated with receiving of an image comprising at least a portion of a GUI output of the system under test at the test computer;
compare the first and second time values to determine timing information; and
update the test description using the timing information.

21. A computer system comprising:
a computer readable medium as claimed in claim 20,
a processor device configured to execute the said instructions on the said computer readable medium.

22. The computer system as claimed in claim 21, comprising a clock configured to identify the receiving and/or transmitting of a communication between the computer system and the system under test.

23. The computer system as claimed in claim 21, further comprising a user interface configured to allow a user to interact with the system under test.

* * * * *